US009708418B2

(12) United States Patent
Hyde et al.

(10) Patent No.: US 9,708,418 B2
(45) Date of Patent: Jul. 18, 2017

(54) PROCESS FOR RECYCLING SOLVENT USED IN AN ETHYLENE-BASED POLYMERIZATION REACTION AND SYSTEM THEREFOR

(75) Inventors: Stacey Hyde, Manvel, TX (US); Anthony J. Castelluccio, Lake Jackson, TX (US); Frederik E. Gemoets, Wommelgem (BE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 694 days.

(21) Appl. No.: 14/001,220

(22) PCT Filed: Feb. 16, 2012

(86) PCT No.: PCT/US2012/025327
§ 371 (c)(1),
(2), (4) Date: Aug. 23, 2013

(87) PCT Pub. No.: WO2012/154242
PCT Pub. Date: Nov. 15, 2012

(65) Prior Publication Data
US 2013/0341567 A1     Dec. 26, 2013

Related U.S. Application Data

(60) Provisional application No. 61/450,506, filed on Mar. 8, 2011.

(51) Int. Cl.
*C08F 2/06* (2006.01)
*B01D 15/00* (2006.01)
(Continued)

(52) U.S. Cl.
CPC .............. *C08F 2/06* (2013.01); *B01D 15/00* (2013.01); *C08F 6/003* (2013.01); *C08F 210/02* (2013.01);
(Continued)

(58) Field of Classification Search
CPC ...... C08F 6/003; C08F 110/02; C08F 210/14; C08F 210/16
See application file for complete search history.

(56) References Cited

U.S. PATENT DOCUMENTS 3,153,027 A * 10/1964 Hagemeyer, Jr. ........ B01J 38/00
526/104
3,330,778 A * 7/1967 Irvin .................... B01J 20/3408
502/31
(Continued)

FOREIGN PATENT DOCUMENTS

JP      S63314209      12/1988
JP      2010-95494      4/2010
(Continued)

OTHER PUBLICATIONS

Response to Singapore Written Opinion dated Oct. 30, 2014 filed Mar. 5, 2015 for counterpart Singapore Application No. 201306727-7, 6 pages.
(Continued)

*Primary Examiner* — Michael A Salvitti
(74) *Attorney, Agent, or Firm* — Cantor Colburn LLP

(57) ABSTRACT

A process for recycling solvent used in an ethylene-based polymerization comprising: passing a solvent stream which has been used in a first ethylene-based solvent polymerization reactor through an online purification bed to produce a recycle solvent stream, wherein the solvent stream prior to being passed through the online purification bed comprises solvent, ethylene, hydrogen, polymerization by-products and optionally comonomer; and passing the recycle solvent stream from the online purification bed to a second ethylene-based solvent polymerization reactor; wherein the second ethylene-based solvent polymerization reactor exhibits a catalyst efficiency dip of less than or equal to 20% for no longer than a forty-eight hour period following a swap of the (Continued)

online purification bed to a regenerated purification bed which contains an adsorbent having low reactivity to alkenes is provided.

13 Claims, 3 Drawing Sheets

(51) Int. Cl.
  *C08F 210/02* (2006.01)
  *C08F 6/00* (2006.01)
(52) U.S. Cl.
  CPC .......... *B01J 2219/0004* (2013.01); *B01J 2219/00038* (2013.01)

(56) References Cited

U.S. PATENT DOCUMENTS

| | | | | |
|---|---|---|---|---|
| 4,105,609 | A * | 8/1978 | Machon | C08F 6/02 524/394 |
| 4,379,882 | A * | 4/1983 | Miyata | C08K 3/22 524/394 |
| 4,725,338 | A * | 2/1988 | Asanuma | B01D 3/40 203/38 |
| 4,864,072 | A * | 9/1989 | Drake | B01J 31/143 502/111 |
| 5,844,045 | A * | 12/1998 | Kolthammer | C08F 10/02 525/240 |
| 2002/0147377 | A1* | 10/2002 | Kanazirev | B01J 20/041 585/820 |
| 2004/0054091 | A1 | 3/2004 | Diaz et al. | |
| 2010/0249474 | A1* | 9/2010 | Nicholas | B01J 29/7046 585/330 |
| 2011/0003940 | A1* | 1/2011 | Karjala | C08F 10/00 525/240 |
| 2011/0027156 | A1* | 2/2011 | Eisinger | B01D 15/00 423/219 |
| 2012/0009109 | A1* | 1/2012 | Wright | B01D 53/75 423/239.1 |
| 2012/0088893 | A1* | 4/2012 | Jog | C08F 10/02 526/348 |
| 2012/0095181 | A1* | 4/2012 | Hottovy | B01D 53/1487 526/352 |
| 2012/0232232 | A1* | 9/2012 | Hottovy | B01D 53/1487 526/68 |
| 2013/0341567 | A1* | 12/2013 | Hyde | B01D 15/00 252/364 |
| 2014/0343229 | A1* | 11/2014 | Weeks | C08L 23/06 525/125 |

FOREIGN PATENT DOCUMENTS

| | | |
|---|---|---|
| WO | 96/33227 A1 † | 10/1996 |
| WO | WO 98/09995 | 3/1998 |
| WO | WO 2006/009942 | 1/2006 |
| WO | WO 2011/008955 A1 * | 1/2011 |

OTHER PUBLICATIONS

Written Opinion and Search Report from PCT counterpart Application No. PCT/US2012/025327.
IPRP from PCT counterpart Application No. PCT/US2012/025327.
Chinese Office Action dated Apr. 28, 2015; from Chinese counterpart Application No. 201280012290.0.
Zeoraito, "Hybrid Adsorptive Agent of Zeolite Molecular Sieve and Activated Alimina," Japan Association of Zeolite, Sep. 10, 2011, vol. 27, No. 3, pp. 13.
JP Office Action dated Nov. 24, 2015; from JP counterpart Application No. 2013-557731.
Singapore Office Action dated Oct. 30, 2014; from Singapore counterpart Application No. 201306727-7.
Japanese Office Action dated Jun. 7, 2016; from Japanese counterpart Application No. 2013-557731.
EP Office Action dated Aug. 3, 2016; from EP counterpart Application No. 12707189.2.
Smith, "Adsorbent Product Application Technology Considerations in the Production of Polyolefins", Pacifichem (pp. 1-19), 2010.†
UOP LLC, A Honeywell Company, "UOP AZ-300 Adsorbent", UOP LLC, (1 page) 2011.†
Rosamonte'sPhys.Chem.Website;http://physicalchemistryrosamonte.wordpress.com/material-balances/material-balances-on-a-crystallizer/physical-properties-of-pure-methanol/dipole-moment,citing Lide, ed.,CRC Handbk of Chem. &Phys.,85thed, CRC,18p.,2004.†

\* cited by examiner
† cited by third party

PROCESS FOR RECYCLING SOLVENT USED IN AN ETHYLENE-BASED POLYMERIZATION REACTION AND SYSTEM THEREFOR

FIELD OF INVENTION

The instant invention relates to a process for recycling solvent used in an ethylene-based polymerization reaction and system therefor.

BACKGROUND OF THE INVENTION

Conventional ethylene-based polymerization processes which employ a solvent are well known. Such conventional ethylene-based polymerization processes include, but are not limited to, solution polymerization process, slurry phase polymerization process, and combinations thereof but do not include gas phase or high pressure polymerization processes. Ethylene-based solution and slurry polymerization processes typically employ one or more loop reactors, isothermal reactors, pipe flow reactors, stirred tank reactors, batch reactors, in parallel or series, and/or any combinations thereof and typically utilize coordination catalysts. Following the polymerization reaction in ethylene-based polymerization reactions, the resultant mixture, e.g. ethylene/α-olefin interpolymer, and solvent stream is typically removed from the reactor and the interpolymer is isolated. After being used in the polymerization reaction, the solvent contains one or more of a number of polymerization by-products, including catalyst by-products, acid neutralizer and its by-products, water, hydrogen, ethylene and comonomer. Solvent is typically recovered via a solvent recovery unit, i.e. heat exchangers and vapor liquid separator drum. Following recovery, the solvent may be recycled back into the polymerization system. In some systems, the solvent is sent through a purification bed, which contains an adsorbent, to remove certain polymerization reaction by-products, particularly polar compounds, such as water, prior to being recycled to a polymerization reactor.

Adsorbents used in purification beds require regeneration following some use and therefore, two or more purification beds are used so that at least one regenerated purification bed is online, purifying a solvent stream, while a nearly saturated purification bed is taken offline for regeneration. When purification beds are swapped in this manner, a temporary catalyst efficiency dip is observed in some systems. One such adsorbent which, when used in a regenerated bed being brought online, causes a substantial catalyst efficiency dip is MOLSIV-13X, available from UOP, LLC. MOLSIV-13X is alkali aluminum silicate having the general formula, $Na_x[(AlO_2)_x(SiO_2)_y].zH_2O$, wherein it is not a hybrid with alumina.

The present invention provides a process for recycling the solvent used in an ethylene-based solvent polymerization process, and a system therefor, which results in a catalyst efficiency dip of less than or equal to 20% when purification beds are swapped.

SUMMARY OF THE INVENTION

The instant invention is a process for recycling a solvent used in an ethylene-based polymerization reaction and a system therefor.

In one embodiment, the instant invention provides a process for recycling solvent used in an ethylene-based polymerization comprising: passing a solvent stream which has been used in a first ethylene-based solvent polymerization reactor through an online purification bed to produce a recycle solvent stream, wherein the solvent stream prior to being passed through the online purification bed comprises solvent, ethylene, hydrogen, polymerization by-products and optionally comonomer; and passing the recycle solvent stream from the online purification bed to a second ethylene-based solvent polymerization reactor; wherein the second ethylene-based solvent polymerization reactor exhibits a catalyst efficiency dip of less than or equal to 20% for no longer than a forty-eight hour period following a swap of the online purification bed to a regenerated purification bed which contains an adsorbent having low reactivity to alkenes.

In an alternative embodiment, the instant invention further provides a system for recycling a solvent used in an ethylene-based polymerization reaction comprising: an ethylene-based solvent polymerization reactor, wherein the ethylene-based solvent polymerization reactor utilizes a solvent thereby producing a solvent stream; an online purification bed, wherein the purification bed is configured to accept the solvent stream; and a regenerated purification bed containing an adsorbent having a low reactivity to alkenes, wherein the online and regenerated purification beds are configured to permit a swap between the purification beds for accepting the solvent stream.

In an alternative embodiment, the instant invention provides a process for recycling solvent used in an ethylene-based polymerization and a system for recycling a solvent used in an ethylene-based polymerization reaction, in accordance with any of the preceding embodiments, except that the first and second ethyelene-based solvent polymerization reactors are the same reactor.

In an alternative embodiment, the instant invention provides a process for recycling solvent used in an ethylene-based polymerization and a system for recycling a solvent used in an ethylene-based polymerization reaction, in accordance with any of the preceding embodiments, except that the first and second ethylene-based solvent polymerization reactors are different reactors.

In an alternative embodiment, the instant invention provides a process for recycling solvent used in an ethylene-based polymerization and a system for recycling a solvent used in an ethylene-based polymerization reaction, in accordance with any of the preceding embodiments, except that the adsorbent is a hybrid zeolite/modified alumina adsorbent.

In an alternative embodiment, the instant invention provides a process for recycling solvent used in an ethylene-based polymerization and a system for recycling a solvent used in an ethylene-based polymerization reaction, in accordance with any of the preceding embodiments, except that the adsorbent is an alumina-zeolite composite or hybrid comprising an alkali metal aluminosilicate having the general formula $Na_x[(AlO_2)_x(SiO_2)_y].zH_2O$ hybrid with alumina.

In an alternative embodiment, the instant invention provides a process for recycling solvent used in an ethylene-based polymerization and a system for recycling a solvent used in an ethylene-based polymerization reaction, in accordance with any of the preceding embodiments, except that the catalyst efficiency dip is 12% or less.

In an alternative embodiment, the instant invention provides a process for recycling solvent used in an ethylene-based polymerization and a system for recycling a solvent used in an ethylene-based polymerization reaction, in accordance with any of the preceding embodiments, except that the catalyst efficiency dip is 6% or less.

In an alternative embodiment, the instant invention provides a process for recycling solvent used in an ethylene-based polymerization and a system for recycling a solvent used in an ethylene-based polymerization reaction, in accordance with any of the preceding embodiments, except that the catalyst efficiency dip is 2% or less.

In an alternative embodiment, the instant invention provides a process for recycling solvent used in an ethylene-based polymerization and a system for recycling a solvent used in an ethylene-based polymerization reaction, in accordance with any of the preceding embodiments, except that at least one of the first and second ethylene-based solvent polymerization reactors contains a coordination catalyst.

In an alternative embodiment, the instant invention provides a process for recycling solvent used in an ethylene-based polymerization and a system for recycling a solvent used in an ethylene-based polymerization reaction, in accordance with any of the preceding embodiments, except that at least one of the first and second ethylene-based solvent polymerization reactors contains a Ziegler-Natta catalyst.

In an alternative embodiment, the instant invention provides a process for recycling solvent used in an ethylene-based polymerization and a system for recycling a solvent used in an ethylene-based polymerization reaction, in accordance with any of the preceding embodiments, except that at least one of the first and second ethylene-based solvent polymerization reactors contains a molecular catalyst, such as a constrained geometry catalyst.

In an alternative embodiment, the instant invention provides a process for recycling solvent used in an ethylene-based polymerization and a system for recycling a solvent used in an ethylene-based polymerization reaction, in accordance with any of the preceding embodiments, except that the recycle solvent further comprises a component selected from the group consisting of calcium stearate, the reaction by-products of calcium stearate, and combinations thereof.

In an alternative embodiment, the instant invention provides a process for recycling solvent used in an ethylene-based polymerization and a system for recycling a solvent used in an ethylene-based polymerization reaction, in accordance with any of the preceding embodiments, except that the recycle solvent further comprises a component selected from the group consisting of a hydrotalcite or hydrotalcite-type material the reaction by-products of the hydrotalcite or hydrotalcite-type material, and combinations thereof.

In an alternative embodiment, the instant invention provides a process for recycling solvent used in an ethylene-based polymerization and a system for recycling a solvent used in an ethylene-based polymerization reaction, in accordance with any of the preceding embodiments, except that the adsorbent having low reactivity to alkenes is an alumina-zeolite composite comprising an alkali metal aluminosilicate having the general formula $Na_x[(AlO_2)_x(SiO_2)_y] \cdot zH_2O$ hybrid with alumina.

In an alternative embodiment, the instant invention provides a process for recycling solvent used in an ethylene-based polymerization and a system for recycling a solvent used in an ethylene-based polymerization reaction, in accordance with any of the preceding embodiments, except that the ethylene-based solvent polymerization reactor is a solution polymerization reactor.

In an alternative embodiment, the instant invention provides a process for recycling solvent used in an ethylene-based polymerization and a system for recycling a solvent used in an ethylene-based polymerization reaction, in accordance with any of the preceding embodiments, except that the ethylene-based solvent polymerization reactor is a slurry reactor.

In an alternative embodiment, the instant invention provides a process for recycling solvent used in an ethylene-based polymerization and a system for recycling a solvent used in an ethylene-based polymerization reaction, in accordance with any of the preceding embodiments, except that the solution polymerization or slurry reactor comprises one or more loop reactors, isothermal reactors, pipe flow reactors, stirred tank reactors, batch reactors in parallel or series or combinations thereof.

In an alternative embodiment, the instant invention provides a process for recycling solvent used in an ethylene-based polymerization consisting essentially of: passing a solvent stream which has been used in a first ethylene-based solvent polymerization reactor through an online purification bed to produce a recycle solvent stream, wherein the solvent stream prior to being passed through the online purification bed comprises solvent, ethylene, hydrogen, polymerization by-products and optionally comonomer; and passing the recycle solvent stream from the online purification bed to a second ethylene-based solvent polymerization reactor; wherein the second ethylene-based solvent polymerization reactor exhibits a catalyst efficiency dip of less than or equal to 20% for no longer than a forty-eight hour period following a swap of the online purification bed to a regenerated purification bed which contains an adsorbent having low reactivity to alkenes.

In an alternative embodiment, the instant invention further provides a system for recycling a solvent used in an ethylene-based polymerization reaction consisting essentially of: an ethylene-based solvent polymerization reactor, wherein the ethylene-based solvent polymerization reactor utilizes a solvent thereby producing a solvent stream; an online purification bed, wherein the purification bed is configured to accept the solvent stream; and a regenerated purification bed containing an adsorbent having a low reactivity to alkenes, wherein the online and regenerated purification beds are configured to permit a swap between the purification beds for accepting the solvent stream.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Definitions

Figure 1:
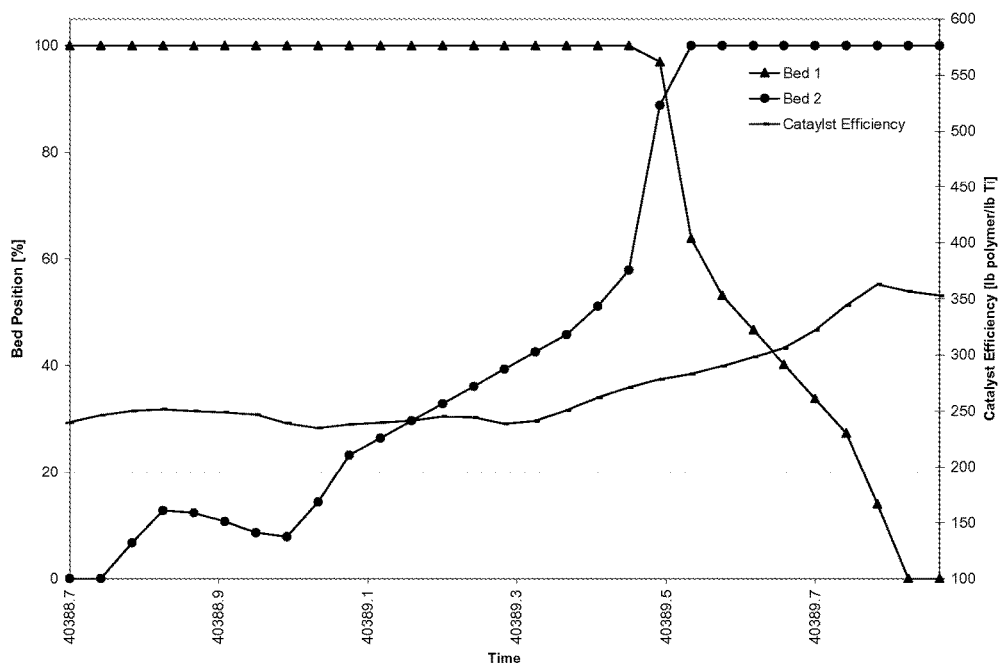
FIG. 1 is a graph illustrating the bed positions of a purification bed containing an adsorbent which does not have a low reactivity to alkenes (MOLSIV-13X) (bed 1) and a purification bed containing an adsorbent which does have a low reactivity to alkenes (specifically AZ-300) (bed 2) and the catalyst efficiency during a swapping process from bed 1 to bed 2 in accordance with Inventive Example 1.
Figure 2:
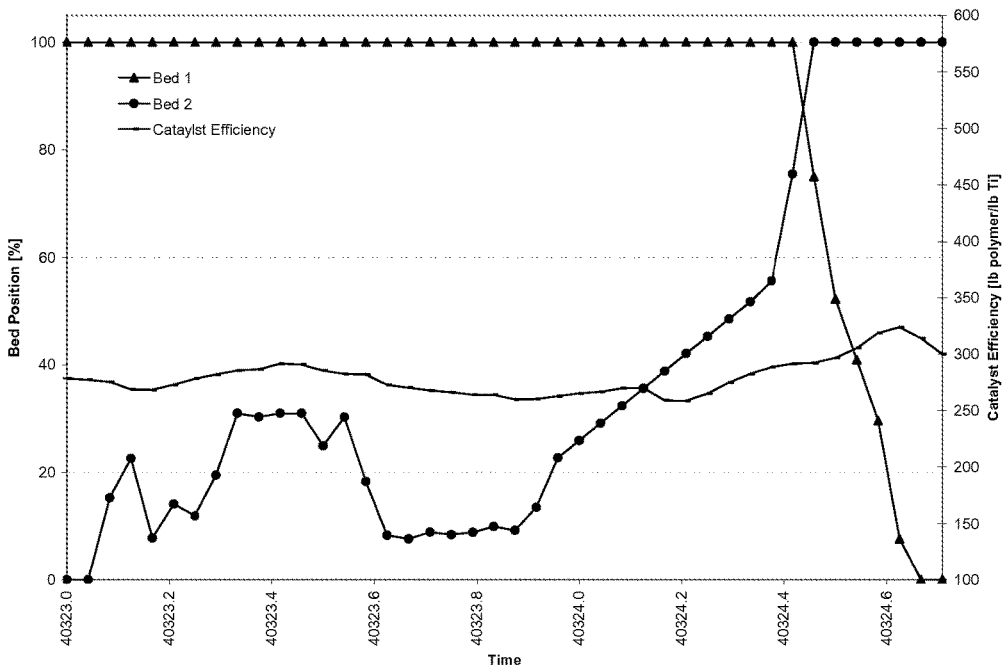
FIG. 2 is a graph illustrating the bed positions of a purification bed containing an adsorbent which does not have a low reactivity to alkenes (MOLSIV-13X) (bed 1) and a purification bed containing an adsorbent which does have a low reactivity to alkenes (specifically AZ-300) (bed 2) and the catalyst efficiency during a swapping process from bed 1 to bed 2 in accordance with Inventive Example 2.
Figure 3:
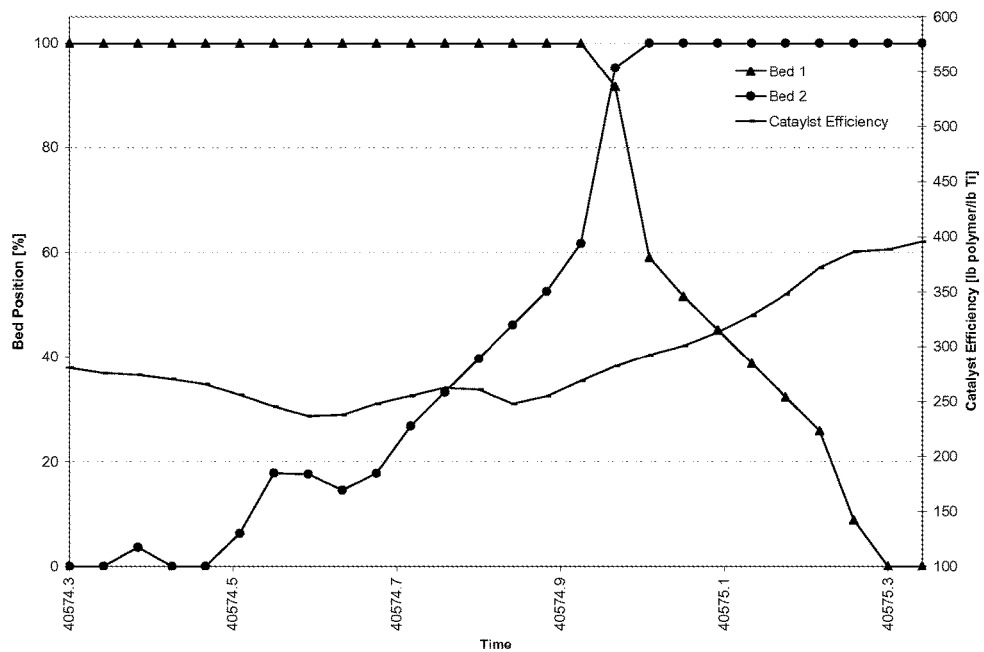
FIG. 3 is a graph illustrating the bed positions of a purification bed containing an adsorbent which does not have a low reactivity to alkenes (MOLSIV-13X) (bed 1) and a purification bed containing an adsorbent which does have a low reactivity to alkenes (specifically AZ-300) (bed 2) and the catalyst efficiency during a swapping process from bed 1 to bed 2 in accordance with Inventive Example 3.
Figure 4:
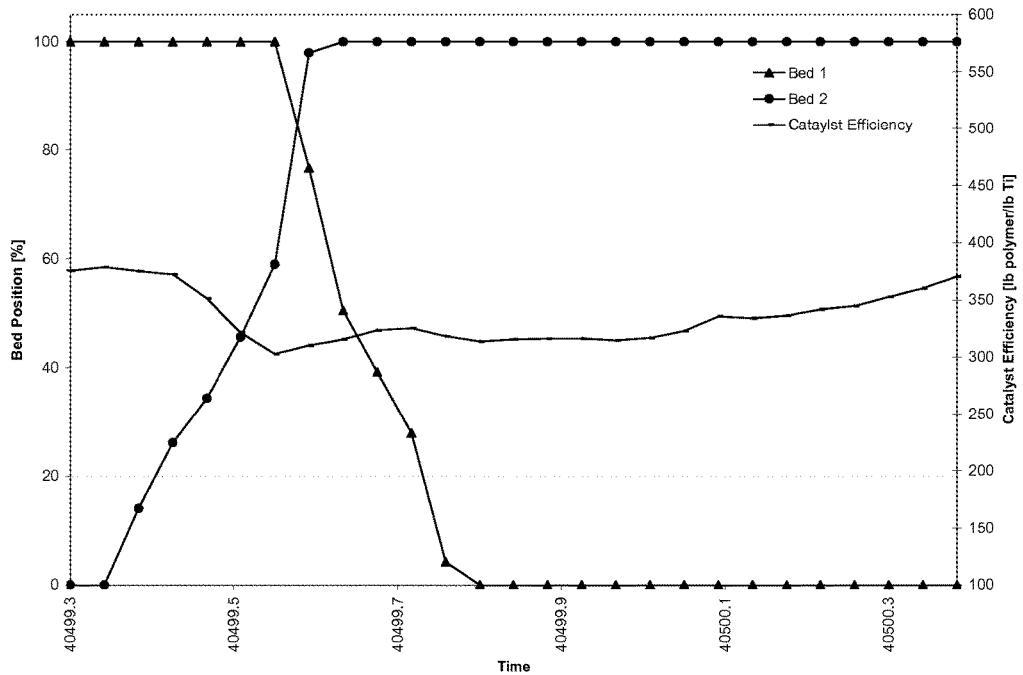
FIG. 4 is a graph illustrating the bed positions of a purification bed containing an adsorbent which does not have a low reactivity to alkenes (MOLSIV-13X) (bed 1) and a purification bed containing an adsorbent which does have a low reactivity to alkenes (specifically AZ-300) (bed 2) and the catalyst efficiency during a swapping process from bed 1 to bed 2 in accordance with Inventive Example 4.

The term "ethylene-based solvent polymerization" refers to a polymerization process utilizing one or more solvents and a coordination catalyst. "Ethylene-based solvent polymerization" processes exclude free radial based, high pressure and gas-phase polymerization processes.

The term "ethylene-based solvent polymerization reactor" refers to any reactor or combination of reactors useful in ethylene-based solvent polymerization, including one or more loop reactors, isothermal reactors, pipe flow reactors, stirred tank reactors, batch reactors, in parallel or series, and/or any combinations The term "coordination catalyst" means a catalyst used in addition polymerization, such as a Ziegler-Natta catalyst, a molecular catalyst, such as a constrained geometry catalyst, or a combination thereof.

The term "linear" in reference to a polymer means that the polymer backbone of the polymer lacks measurable or demonstrable long chain branches; for example, the polymer is substituted with an average of less than 0.01 long branch per 1000 carbons.

The term "polymer" refers to a polymeric compound prepared by polymerizing monomers, whether the same or a different type "comonomer"). The generic term polymer thus embraces the term "homopolymer," unusually employed to refer to polymers prepared from only one type of monomer, and the term "interpolymer" as defined herein.

The term "interpolymer" refers to polymer prepared by the polymerization of at least two different types of monomers. The generic term interpolymer includes copolymers, usually employed to refer to polymer prepared from two different monomers, and polymers prepared from more than two different types of monomers. The term "ethylene/α-olefin interpolymer" means a polymer having units derived from ethylene and units derived from an α-olefin comonomer.

The term "ethylene-based polymer" refers to polymer that contains more than 50 mole percent units derived from ethylene (based on total amount of polymerizable monomer) and, optionally, may contain at least one comonomer.

The term "ethylene/α-olefin interpolymer" refers to an interpolymer that contains more than 50 mole percent units derived from ethylene (based on total amount of polymerizable monomers) and at least one α-olefin.

The term "purification beds" means any vessel capable of holding the adsorbent, including, for example, a vessel with a screen to prevent the adsorbent from migrating from the vessel into other process components.

The term "low reactivity to alkenes" as applied to adsorbents means that the exposure of the absorbent to a chlorooctane and ethylene produces less than or equal to 650 mg ethylene dimer/(kg adsorbent·h).

The term "catalyst efficiency" refers to the measurement of mass balance calculation of quantity polymer is produced per quantity of active catalyst transition metal used.

The term "catalyst efficiency dip" refers to the largest decrease in "catalyst efficiency" for no more than forty-eight hours following the time at which a purification bed swapping process begins, based upon the catalyst efficiency immediately preceding initiation of the purification bed swapping process.

The term "bed position" refers to the percentage the bed which is online receiving and purifying used solvent, where less than 20% means the bed is offline and 100% means the bed is completely online.

The term "transition metal" means any metal of Groups IVB, VB, VIIB, VIIB or VIII of the Periodic Table.

The term "polymerization by-products" means any compound, other than the intended interpolymer product, which is produced in the polymerization reactor, including but not limited to, catalyst by-products, acid neutralizer, acid neutralizer by-products, water, hydrogen, ethylene and comonomer.

Preferred Embodiments

The instant invention is a process for recycling solvent used in an ethylene-based polymerization reaction and system therefor.

The process for recycling solvent used in an ethylene-based polymerization according to the present invention comprises: passing a solvent stream which has been used in a first ethylene-based solvent polymerization reactor through an online purification bed to produce a recycle solvent stream, wherein the solvent stream prior to being passed through the online purification bed comprises solvent, ethylene, hydrogen, polymerization by-products and optionally comonomer; and passing the recycle solvent stream from the online purification bed to a second ethylene-based solvent polymerization reactor; wherein the second ethylene-based solvent polymerization reactor exhibits a catalyst efficiency dip of less than or equal to 20% for no longer than a forty-eight hour period following a swap of the online purification bed to a regenerated purification bed which contains an adsorbent having low reactivity to alkenes.

The instant invention further provides a system for recycling a solvent used in an ethylene-based polymerization reaction.

The system for recycling a solvent used in an ethylene-based polymerization reaction according to the present invention comprises: an ethylene-based solvent polymerization reactor, wherein the ethylene-based solvent polymerization reactor utilizes a solvent thereby producing a solvent stream; an online purification bed, wherein the purification bed is configured to accept the solvent stream; and a regenerated purification bed containing an adsorbent having a low reactivity to alkenes, wherein the online and regenerated purification beds are configured to permit a swap between the beds for accepting the solvent stream.

The inventive process and system may be utilized in any conventional ethylene-based solvent polymerization reactor or in any system comprising an ethylene-based solvent polymerization reactor.

The inventive process and system provides a catalyst efficiency dip of less than or equal to 20%. All individual values and subranges from less than or equal to 20% are included herein and disclosed herein; for example, the catalyst efficiency dip can be from a lower limit of 0%, 1%, 6%, 10% or 15% to an upper limit of 2%, 5%, 9%, 12%, 15%, 17% or 20%. For example, the catalyst efficiency dip may be in the range of from 0% to 20%, or in the alternative, the catalyst efficiency dip may be in the range of from 0% to 12%, or in the alternative, the catalyst efficiency dip may be in the range of from 0% to 6%, or in the alternative, the catalyst efficiency dip may be in the range of from 6% to 12%.

The inventive process and system utilize a coordination catalyst. In a specific embodiment, the catalyst is a Ziegler-Natta catalyst. In another embodiment, the catalyst is a molecular catalyst, such as a constrained geometry catalyst.

In specific embodiments, the catalyst is any one of the molecular catalysts disclosed in U.S. Pat. No. 6,420,507 and WO 9715583, the disclosures of which are incorporated herein by reference.

In some embodiments, the first ethylene-based solvent reactor is a solution polymerization reactor. Alternatively, the first ethylene-based solvent reactor may be a slurry polymerization reactor.

In some embodiments, the second ethylene-based solvent reactor is a solution polymerization reactor. Alternatively, the second ethylene-based solvent reactor may be a slurry polymerization reactor.

The first and second ethylene-based solvent polymerization reactors may be the same reactor. In alternative embodiments, the first and second ethylene-based solvent polymerization reactors may be different reactors.

The first ethylene-based solvent polymerization reactor may be selected from the group consisting of one or more loop reactors, isothermal reactors, pipe flow reactors, stirred tank reactors, batch reactors, in parallel or series, and/or any combinations thereof.

The second ethylene-based solvent polymerization reactor may be selected from the group consisting of one or more loop reactors, isothermal reactors, pipe flow reactors, stirred tank reactors, batch reactors, in parallel or series, and/or any combinations thereof.

Purification beds which may be used in the inventive process include any vessel capable for holding the adsorbent. Exemplary suitable vessels include tanks, tubes, and drums. In some embodiments, the purification beds further include a screen to keep the adsorbent in the bed. Purification bed useful in the invention may be configured to accept the solvent by any appropriate means, including for example, of direct or indirect fluid communication with the polymerization reactor(s). In alternative embodiments, the purification beds are not in fluid communication with the polymerization reactor(s) and the solvent stream is batch-wise transferred to the purification beds.

Adsorbents useful in the invention include alumina-zeolite composites having a low reactivity to alkenes. One example of such an adsorbent is available from UOP as AZ-300, which is an alumina-zeolite composite or hybrid, comprising an alkali aluminum silicate, having the general formula $Na_x[(AlO_2)_x(SiO_2)_y].zH_2O$ hybrid with alumina.

Adsorbents having a low reactivity to alkenes include those alumina-zeolite composites which, upon exposure to a chlorooctane and ethylene produces less than or equal to 650 mg ethylene dimer/(kg adsorbent*h). All individual values and subranges from less than or equal to 650 mg ethylene dimer/(kg adsorbent*h) are included herein and disclosed herein; for example, the production of dimer can be from an upper limit of 100, 200, 300, 400, 500, 600 or 650 mg ethylene dimer/(kg adsorbent*h).

In one embodiment, both the online and regenerated purification beds contain an adsorbent having a low reactivity to alkenes. In an alternative embodiment, the online purification bed contains an adsorbent which does not have a low reactivity to alkenes.

In yet another embodiment the regenerated and online purification beds both contain an adsorbent comprising an alumina-zeolite composite. In an alternative embodiment, only the regenerated bed contains an alumina-zeolite composite.

In yet another embodiment, the regenerated bed and the online bed both contain alumina-zeolite composite or hybrid, comprising an alkali aluminum silicate, having the general formula $Na_x[(AlO_2)_x(SiO_2)_y].zH2O$ hybrid with alumina in an alternative embodiment, only the regenerated bed contains alumina-zeolite composite, comprising an alkali aluminum silicate, having the general formula $Na_x[(AlO_2)_x(SiO_2)_y].zH_2O$ hybrid with alumina.

Solution Phase Polymerization Process

Any conventional solution-phase polymerization process using one or more loop reactors, isothermal reactors, and combinations thereof may be employed in the inventive process. An example of such a solution polymerization process can be found in WO 97/036942. Solution polymerization conditions utilize a solvent for the respective components of the reaction. Preferred solvents include mineral oils and the various hydrocarbons which are liquid at reaction temperatures: Illustrative examples of useful solvents include alkanes such as pentane, isopentane, hexane, heptane, octane and nonane, as well as mixtures of alkanes including kerosene and ISOPAR E, available from Exxon Chemicals Inc.; cycloalkanes such as cyclopentane and cyclohexane; and aromatics such as benzene, toluene, xylenes, ethylbenzene and diethylbenzene. The solvent will be present in an amount sufficient to prevent phase separation in the reactor. As the solvent functions to absorb heat, less solvent leads to a less adiabatic reactor. The solvent: ethylene ratio (weight basis) will typically be from 2.5:1 to 12:1.

In general, a solution phase polymerization process occurs in one or more well-stirred reactors such as one or more loop reactors or one or more spherical adiabatic reactors at a temperature in the range of from 80 to 300° C. and at pressures in the range of from 300 to 1000 psig. The residence time in solution phase polymerization process is typically in the range of from 2 to 30 minutes. Ethylene, solvent, coordination catalyst composition, and optionally one or more comonomers are fed continuously to the reactor. Exemplary coordination catalyst compositions in these embodiments include, for example, Ziegler-Natta catalysts, as described herein.

After the polymer solution leaves the reactor, catalyst kill agent and/or acid neutralizers may be added to the solution. For example, acid neutralizers may be either a natural or synthetic hydrotalcite. Examples of synthetic hydrotalcite compounds include: $Mg_6Al_2(OH)_{16}CO_3.4H_2O$ (natural hydrotalcite, which may be synthetically produced), $Mg_{4.5}Al_2(OH)_{13}CO_3.3.5H_2O$, $Mg_{4.5}Al_2(OH)_{13}CO_3$, $Mg_4Al_2(OH)_{12}CO_3.3.5H_2O$, $Mg_5Al_2(OH)_{14}CO_3.4H_2O$, $Mg_3Al_2(OH)_{10}CO_3.1.7H_2O$, $Mg_3ZnAl_2(OH)_{12}CO_3.xH_2O$, and $Mg_3ZnAl_2(OH)_{12}CO_3$. Synthetic hydrotalcites that are commercially available include, for example, those available from Kisuma Chemicals By, under the name DHT-4A. After the polymer solution leaves the reactor, the solvent with unconverted ethylene monomer and 1-octene comonomer may be removed from the polymer solution via a devolatilization system, and then recycled. Impurities may be removed from the recycled stream before entering the reactor again. The polymer melt may, for example, be pumped through a die specially designed for underwater pelletization. The pellets are transferred to classifier screens to remove over and undersize particles. The finished pellets are then transferred to storage devices.

Slurry Polymerization Processes

Any conventional slurry process may be utilized in the invention. In general, a slurry process comprises three phases in the reaction mixture: a liquid phase formed by an inert hydrocarbon diluent; a gas phase consisting of ethylene, hydrogen, and a comonomer (in some cases for making LLDPE); and a solid phase consisting of particles, each of which serves as a microreactor. Two types of reactors are most commonly used for slurry-phase polymerization: stirred-tank (or autoclave) reactors and double-tube loop reactors. A light hydrocarbon diluent, such as isobutane, is often employed in the slurry process with the loop reactor, while a heavy hydrocarbon diluent, such as n-hexane or n-heptane, is used in the slurry process with the autoclave reactor. Various catalyst systems are used in the commercial slurry processes: advanced Ziegler, Ziegler-Natta, chromium, and metallocene. Exemplary catalysts useful in a slurry phase polymerization process include those disclosed in WO9719959, U.S. Pat. No. 5,414,180, U.S. Pat. No. 5,354,721, U.S. Pat. No. 5,543,376, and U.S. Pat. No. 4,364,855. A slurry process typically uses temperatures of from 0° C. up to a temperature just below the temperature at which the resulting polymer becomes substantially soluble in the inert polymerization medium. Preferred temperatures are from 40° C. to 115° C.

One exemplary slurry phase process utilizes a stirred tank reactor with a single-site catalyst system. Such catalyst comprises bis(cyclopentadienyl) zirconium dichloride ((Cp)2ZrCl2), tri-isobutylaluminum (TIBA) as a cocatalyst, and a modified silica support activated by dimethylanilinium-4-((4'-hydroxyphenyl)phenyl)tris(perfluorophenyl)-borate suspended in n-hexane. Ethylene and a comonomer, 1-butene, are fed into the reactor and the reactor is maintained at 70° C. and 2.1 MPas.

The polyethylene slurry from the reactor, containing about 34 wt % solids in n-hexane, is sent to a steam stripper, where residual unconverted ethylene and other volatile compounds are removed along with some n-hexane. The stripped polymer slurry is further centrifuged before the polymer wet cake is dried in a fluid-bed dryer. The dried polymer is compounded and pelletized before it is packaged and sent to storage.

The stripped mixture is condensed and decanted to recover crude n-hexane, which is combined with the liquid mixture from the centrifuging operation. The combined crude n-hexane is distilled to remove both heavy ends and light ends, and to recover distilled n-hexane. The distilled n-hexane may then be cooled and passed through an adsorbent bed containing an adsorbent having low reactivity to alkenes. Alternatively, the crude n-hexane may be treated solely with the adsorbent bed without distillation. In yet another alternative, the crude n-hexane may be first treated by passing through the adsorbent bed followed by distillation.

Ethylene-Based Polymers

Ethylene-based polymers which can be prepared the inventive process utilizing a Ziegler-Natta or molecular catalyst, such as a constrained geometry catalyst. Examples of linear ethylene-based polymers include high density polyethylene (HDPE) and linear low density polyethylene (LLDPE). Suitable polyolefins include, but are not limited to, ethylene/α-olefin interpolymers, ethylene homopolymers, and blends thereof.

The linear ethylene-based polymer may comprise units derived from one or more α-olefin copolymers as long as there is at least 50 mole percent polymerized ethylene monomer in the polymer High density polyethylene (HDPE) may have a density range of about 0.94 to about 0.97 $g/cm^3$. HDPE is typically a homopolymer of ethylene or interpolymer or ethylene and low levels of one or more α-olefin copolymer. HDPE contains relatively few branch chains relative to the various copolymer of less than 5 mole % of the units derived from one or more α-olefin comonomers.

Linear ethylene-based polymer such as linear low density polyethylene (LLDPE) and ultra low density polyethylene (ULDPE) are characterized by an absence of long chain branching, in contrast to convention low crystalline, highly branched ethylene-based polymers such as LDPE. Heterogeneous linear ethylene-based polymers such as LLDPE can be prepared in solution or slurry phase polymerization of ethylene and one or more α-olefin comonomers in the presence of a Zieglar-Natta catalyst, by process such as are disclosed in U.S. Pat. No. 4,076,098 (Anderson, et al.). Relevant discussions of both of these classes of materials, and their methods are found in U.S. Pat. No. 4,950,541 (Tabor, et al.). Other patents and publications to make LLDPE include WO 2008/0287634, U.S. Pat. No. 4,198,315, U.S. Pat. No. 5,487,938, EP0891381, and U.S. Pat. No. 5,977,251.

An α-olefin comonomer may have, for example, from 3 to 20 carbon atoms. Preferably, the α-olefin comonomer may have 3 to 8 carbon atoms. Exemplary α-olefin comonomers included, but not limited to, 1-butene, 3-methyl-1-butene, 1-pentene, 3-methyl-1-pentene, 4-methyle-1-pentene, 1-hexene, 1-heptene, 4,4-dimethyl-1-pentene, 3-ethylene-1-pentene, 1-octene, 1-nonene, 1-decene, 1-dodecene, 1-tetrdecene, 1-hexadecene, 1-octadecene, and 1-eicosene.

Test Methods

Catalyst Efficiency

Catalyst efficiency is a measurement of mass balance calculation of quantity polymer is produced per quantity of active catalyst transition metal used.

Reactivity to Alkenes

The catalytic activity of adsorbents for oligomerization reactions was quantified as follows:

Inside a glovebox, 25 g of the adsorbent and 250 mL of purified 1-octene were added in a vial. The vial was properly capped and stored in an oven at 80° C. for exactly 7 hours (h). The liquid-phase was then analyzed by gas chromography (GC) to determine the total content of octene dimers (See Table 1). The total dimer content was quantified by applying a mass-based calibration line for dodecane on the sum of all peaks eluting between 13.5 and 18.5 minutes (peaks eluting around hexadecane). After subtraction of the dimer content of the blank sample (1-octene), the total concentration of dimers was transformed into a 7 h based pure 1-octene dimerization activity at 80° C., by dividing the mass of dimers produced by the mass of adsorbent and by the 7 h reaction time. The pure 1-octene dimerization activity was expressed in units mg ethylene dimer/(kg adsorbent*h).

TABLE 1

| | |
|---|---|
| GC | HP6890+ |
| Column | Type HP-5, 30 m × 0.320 mm, df = 0.25 μm |
| Column pressure | 8.7 psig (10 min), ramp 2.9 psig/min to 17.4 psig (47 min) |
| Carrier | $N_2$ |
| Temperature program | 80° C. (5 min), ramp 5° C./min to 120° C., 10° C./min to 200° C. (39 min) |
| Injection technique | Cool-on-column |
| Injector temperature | track-oven +3° C. |
| Injection volume | 0.5 μl |
| Detector | FID (300° C.) |

The 1-octene dimerization activities of MOLSIV-13X and AZ-300 (both available from UOP, LLC) after 7 h at 80° C. are shown in Table 2 and are expressed in mg ethylene dimer/(kg adsorbent·h). Pristine AZ-300 possesses no observable activity for 1-octene dimerization, while MOLSIV-13X clearly exhibits dimerization activity. The dimerization activity is strongly enhanced after exposing the adsorbents to 1-chlorooctane (one of the chloroalkanes present in recycle solvent). Where the adsorbents have been exposed to 1-choroalkanes prior to or concurrently with exposure to the 1-octene, the difference in dimerization activity between AZ-300 and MOLSIV-13X is greater. The chlorooctane treated AZ-300 shows greater dimerization activity than the pristine AZ-300. However, the chlorooctane treated AS-300 shows substantially less dimerization activity than the chlorooctane treated MOLSIV-13X.

TABLE 2

| | MOLSIV-13X | AZ-300 |
|---|---|---|
| Pristine adsorbent* | 130 | −7 |
| 1-chlorooctane treated sample** | 11400 | 620 |
| Spent plant sample*** | 1780 | — |

*Previously unused adsorbent regenerated under nitrogen flow at 275° C. for 16 h.
**Adsorbent submerged in a vial filled with 1-chlorooctane for 16 h inside the glovebox, after which the liquid was decanted from the adsorbent and the adsorbent was regenerated under nitrogen flow at 275° C. for 16 h.
***Adsorbent regenerated under nitrogen flow at 275° C. for 16 h.

In order to determine if the chlorine treatment could simulate the catalyst efficiency dip observed in commercial plants, 50 mL (or 10 mL in the case of the 1-chlorooctane treated MOLSIV-13X sample) of a solvent stream that was contacted with the adsorbents for 7 h at 80° C. was injected in a batch reactor running an ethylene polymerization with a Ziegler Natta catalyst (and triethylaluminum cocatalyst). This contacting/injection procedure was repeated several times and the resulting catalyst efficiencies were compared to those of the standard blank runs. The resulting relative catalyst efficiencies are listed in Table 3. While pristine and spent plant MOLSIV-13X did not induce any catalyst efficiency loss, the chloride treated MOLSIV-13X clearly did. The chloride treated AZ-300, on the other hand, did not induce any effect on the catalyst efficiency.

TABLE 3

| | MOLSIV-13X | AZ-300 |
|---|---|---|
| Pristine adsorbent* | 100% | |
| 1-chlorooctane treated sample** | 30% | 100% |
| Spent plant sample*** | 100% | |

*Previously unused adsorbent regenerated under nitrogen flow at 275° C. for 16 h.
**Adsorbent submerged in a vial filled with 1-chlorooctane for 16 h inside the glovebox, after which the liquid was decanted from the adsorbent and the adsorbent was regenerated under nitrogen flow at 275° C. for 16 h.
***Adsorbent regenerated under nitrogen flow at 275° C. for 16 h.

EXAMPLES

The following examples illustrate the present invention but are not intended to limit the scope of the invention. The examples of the instant invention demonstrate that use of an adsorbent with low reactivity to alkenes results in catalyst efficiency dip of less than or equal to 20%.

Each of the Comparative and Inventive Process Examples were conducted using a solution polymerization reactor with a coordination catalyst (e.g. Ziegler-Natta catalyst) and triethylaluminum cocatalyst.

The continuous solution polymerization reactors require purified feeds to ensure acceptable catalyst efficiency. These feeds include fresh solvent, monomer, optional comonomer, and hydrogen. Additionally, all recycle flows should also be of sufficient purity as the fresh feed flows to the reactor. The effluent from the solution reaction section (containing solvent, monomer, comonomer, hydrogen, catalyst components, and dissolved polymer) is contacted with catalyst kill, such as water, and acid neutralizer, such as DHT-4A, to stop the reaction. DHT-4A is a synthetic hydrotalcite-type material, available from Mitsui & Co. In addition, various additives, such as anti-oxidants, are added at this point. The stream then goes through a set of static mixing elements to evenly disperse the catalyst kill and any additives.

Following catalyst kill/additive addition, the effluent (containing solvent, monomer, comonomer, hydrogen, catalyst components, and dissolved polymer) enters a two stage separation and devolatization system where the polymer is removed from the solvent, hydrogen, and non-reacted monomer and comonomer. The impurities may be removed from recycled stream before entering the reactor again. The separated and devolatized polymer melt is pumped through a die specially designed for underwater pelletization, cut into uniform solid pellets, dried, and transferred into a hopper. After validation of initial polymer properties, the solid polymer pellets are transferred to storage devices.

The non-polymer portions removed in the devolatilization step pass through various pieces of equipment which separate most of the monomer which is removed or purged from the system. Most of the solvent and comonomer are recycled back to the reactor after passing through purification beds. This solvent can still have non-reacted comonomer in it that is fortified with fresh comonomer prior to re-entry to the reactor. This fortification of the comonomer is an essential part of the product density control method. This recycle solvent can contain some dissolved hydrogen which is then fortified with fresh hydrogen to achieve the polymer molecular weight target. A portion of solvent temporarily leaves the system and is passed through a purification bed and then recycled back into the polymerization reactor.

Once the online bed is nearly saturated, the purification beds are swapped, thereby bringing a regenerated bed online and taking the nearly saturated bed offline. When a purification bed is taken offline, it undergoes a closed-loop regeneration using nitrogen treatment under heat.

In each of the Inventive Examples, bed 1 contains MOL-SIV-13X adsorbent (illustrated by triangles in each FIGS. 1-4) and bed 2 contains AZ-300 adsorbent (illustrated by large circles in each of FIGS. 1-4). The catalyst efficiency is illustrated by a line with small circles in each of FIGS. 1-4. In Inventive Examples 1-4, bed 1 is being taken offline and bed 2 is being brought online. FIGS. 1-4 illustrate the largest efficiency dip exhibited by a purification bed with AZ-300 adsorbent being brought online during an purification bed swap is 20% (FIG. 4) and a catalyst efficiency dip of 0% is achievable (FIG. 1). Catalyst efficiency dips of 6% (FIG. 2) and 12% (FIG. 3) were also observed. Table 4 provides the reaction conditions used in Inventive Examples 1-4.

TABLE 4

|  | First Reactor Temperature (° C.) | Second Reactor Temperature (° C.) | Al:Ti Ratio | Acid Scavenger |
|---|---|---|---|---|
| Inv. Ex. 1 FIG. 1 | 170 | 186.8 | 4.0 | DHT-4A |
| Inv. Ex. 2 FIG. 2 | 202 | 220.9 | 3.0 | DHT-4A |
| Inv. Ex. 3 FIG. 3 | 187 | 202.9 | 3.7 | DHT-4A |
| Inv. Ex. 4 FIG. 4 | 174 | 193.1 | 4.0 | DHT-4A |

Figure 5:
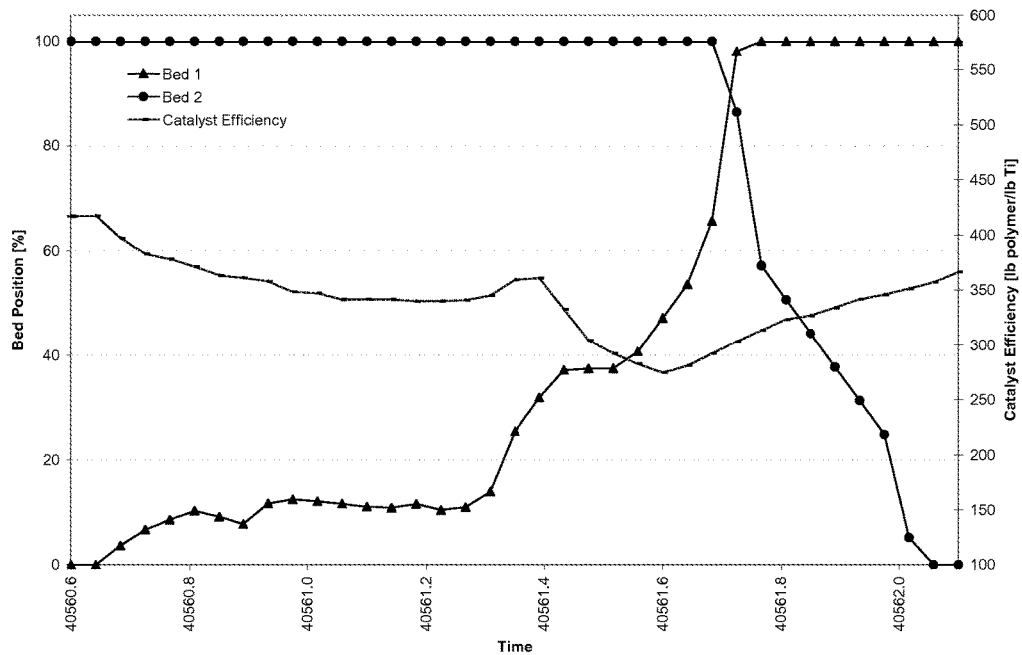
FIG. 5 is a graph illustrating the bed positions of a purification bed containing an adsorbent which does have a low reactivity to alkenes (specifically AZ-300) (bed 2) and a purification bed containing an adsorbent which does not have a low reactivity to alkenes (MOLSIV-13X) (bed 1) and the catalyst efficiency during a swapping process from bed 2 to bed 1 in accordance with Comparative Example 1.

In Comparative Example 1, bed 1 contains MOLSIV-13X (illustrated by triangles in each FIG. 5) and bed 2 contains AZ-300 (illustrated by large circles in each of FIG. 5). In Comparative Example 1, bed 1 is being brought online and bed 2 is being taken offline. The catalyst efficiency is illustrated by a line with small circles in FIG. 5. As can be seen in FIG. 5, when the MOLSIV-13X purification bed is brought online, the polymerization reaction experiences a 33% catalyst efficiency dip.

Figure 6:
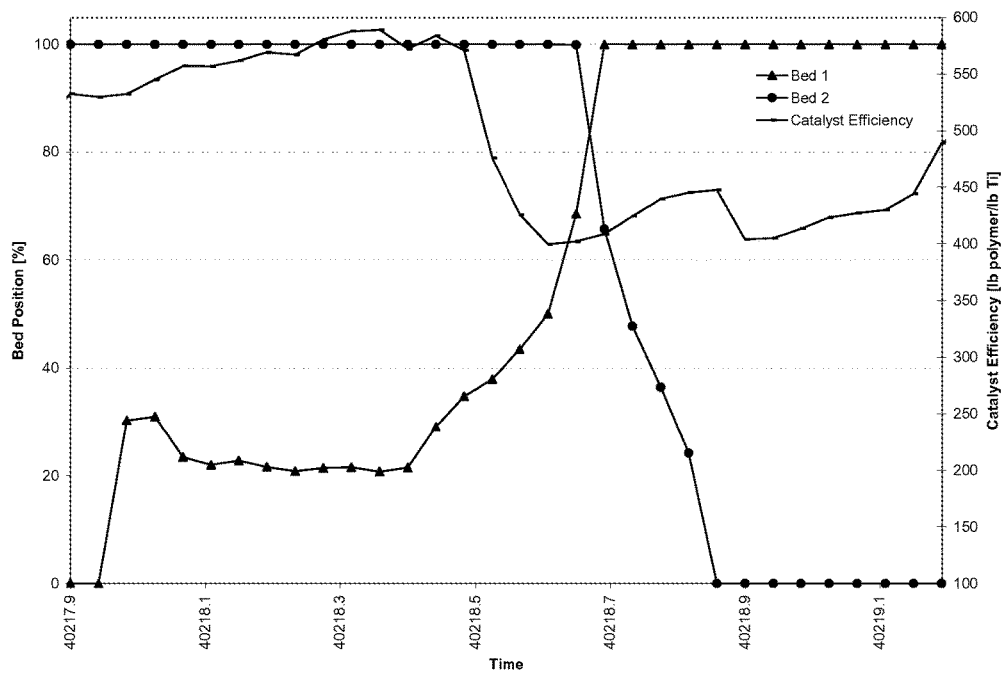
FIG. 6 is a graph illustrating the bed positions of two purification beds (beds 1 and 2), each of which contains an adsorbent which does not have a low reactivity to alkenes (specifically MOLSIV-13X) and the catalyst efficiency during a swapping process from bed 1 to bed 2 in accordance with Comparative Example 2.

In Comparative Example 2, bed 1 and bed 2 each contained MOLSIV-13X. FIG. 6 illustrates the catalyst efficiency when bed 1 is swapped with bed 2 for Comparative Example 2. As can be seen in FIG. 6, a 25% catalyst efficiency dip was observed. Table 5 provides the process conditions for each of Comparative Examples 1 and 2.

TABLE 5

|  | First Reactor Temperature (° C.) | Second Reactor Temperature (° C.) | Al:Ti Ratio | Acid Scavenger |
|---|---|---|---|---|
| Comp. Ex. 1 FIG. 5 | 187 | 203.2 | 3.4 | DHT-4A |
| Comp. Ex. 2 FIG. 6 | 174 | 189.3 | 3.7 | DHT-4A |

All applications, publications, patents, test procedures, and other documents cited, including priority documents, are fully incorporated by reference to the extent such disclosure is not inconsistent with the disclosed processes and systems and for all jurisdictions in which such incorporation is permitted.

Depending upon the context in which such values are described, and unless specifically stated otherwise, such values may vary by 1 percent, 2 percent, 5 percent, or, sometimes, 10 to 20 percent. Whenever a numerical range with a lower limit, RL, and an upper limit, RU, is disclosed, any number falling within the range, including the limits themselves is specifically disclosed. In particular, the following numbers within the range are specifically disclosed: R=RL+k*(RU−RL), wherein k is a variable ranging from 0.01 to 1.00 with a 0.01 increment, that is, k is 0.01 or 0.02 to 0.99 or 1.00. Moreover, any numerical range defined by two R numbers as defined is also specifically disclosed.

The present invention may be embodied in other forms without departing from the spirit and the essential attributes thereof, and, accordingly, reference should be made to the appended claims, rather than to the foregoing specification, as indicating the scope of the invention.

We claim:

1. A process for recycling solvent used in an ethylene-based polymerization comprising:
   providing a first regenerated purification bed comprising an adsorbent which, upon exposure to a chlorooctane and ethylene produces less than or equal to 650 mg ethylene dimer/(kg adsorbent* h);
   swapping said regenerated purification bed with a first online purification bed in an ethylene-based solvent polymerization system;
   thereby converting said regenerated purification bed into an alternative online purification bed in said ethylene-based solvent polymerization system and converting said online purification bed into an alternative regenerated purification bed;
   conveying a solvent stream comprising solvent, ethylene, hydrogen, polymerization by-products and optionally comonomer from a first ethylene-based solvent polymerization reactor to the alternative online purification;
   passing said solvent stream comprising solvent, ethylene, hydrogen, polymerization by-products and optionally comonomer through the alternative online purification bed to produce a recycled solvent stream comprising a recycled solvent; and
   passing the recycled solvent stream from the alternative online purification bed to a second ethylene-based solvent polymerization reactor;
   wherein the second ethylene-based solvent polymerization reactor polymerizes ethylene and optionally one or more α-olefins in the presence of said recycled solvent and exhibits a catalyst efficiency dip of less than or equal to 20% for no longer than a forty-eight hour period following said swap.

2. The process according to claim 1, wherein the first and second ethylene-based solvent polymerization reactors are the same reactor.

3. The process according to claim 1, wherein the first and second ethylene-based solvent polymerization reactors are different reactors.

4. The process according to claim 1, wherein the adsorbent is a hybrid zeolite/modified alumina adsorbent.

5. The process according to claim 4, wherein the adsorbent is an alumina-zeolite composite comprising an alkali metal aluminosilicate having the general formula $Na_x[(AlO_2)_x(SiO_2)_y].zH_2O$ hybrid with alumina.

6. The process according to claim 1, wherein the catalyst efficiency dip is 12% or less.

7. The process according to claim 1, wherein the catalyst efficiency dip is 6% or less.

8. The process according to claim 1, wherein the catalyst efficiency dip is 2% or less.

9. The process according to claim 1, wherein at least one of the first and second ethylene-based solvent polymerization reactors contains a coordination catalyst.

10. The process according to claim 1, wherein at least one of the first and second ethylene-based solvent polymerization reactors contains a Ziegler-Natta catalyst.

11. The process according to claim 1, wherein at least one of the first and second ethylene-based solvent polymerization reactors contains a molecular catalyst.

12. The process according to claim 1, wherein the recycle solvent further comprises a component selected from the group consisting of calcium stearate, reaction by-products of calcium stearate, and combinations thereof.

13. The process according to claim 1, wherein the recycle solvent further comprises a component selected from the group consisting of a natural hydrotalcite, a synthetic hydrotalcite-type material, reaction by-products of the natural or synthetic hydrotalcite-type material, and combinations thereof.

* * * * *